United States Patent
Rhême et al.

(10) Patent No.: US 6,864,964 B2
(45) Date of Patent: Mar. 8, 2005

(54) OPTICAL DISTANCE MEASURING DEVICE

(75) Inventors: Charles Rhême, Posieux (CH); Peter Heimlicher, Fribourg (CH)

(73) Assignee: Optosys SA (CH)

( * ) Notice: Subject to any disclaimer, the term of this patent is extended or adjusted under 35 U.S.C. 154(b) by 0 days.

(21) Appl. No.: 10/613,324

(22) Filed: Jul. 3, 2003

(65) Prior Publication Data

US 2004/0066499 A1 Apr. 8, 2004

(30) Foreign Application Priority Data

Jul. 3, 2002 (EP) .............................................. 02405556

(51) Int. Cl.⁷ ............................ G01C 3/00; G03B 13/00
(52) U.S. Cl. ..................................... 356/3.08; 396/106
(58) Field of Search .............................. 356/3.01–4.01; 396/106

(56) References Cited

U.S. PATENT DOCUMENTS

| | | | |
|---|---|---|---|
| 3,759,614 A | | 9/1973 | Harvey ........................... 356/4 |
| 4,384,199 A | * | 5/1983 | Ogino et al. ................. 250/204 |
| 4,976,543 A | | 12/1990 | Scheck et al. .............. 356/375 |
| 5,109,161 A | * | 4/1992 | Horiuchi et al. ........ 250/559.38 |
| 5,137,350 A | * | 8/1992 | Misawa et al. ............ 356/3.03 |
| 5,519,204 A | * | 5/1996 | Rudd et al. .................. 250/205 |
| 6,636,300 B2 | * | 10/2003 | Doemens et al. ......... 356/141.1 |

FOREIGN PATENT DOCUMENTS

| | | |
|---|---|---|
| DE | 24 55 733 | 5/1976 |
| DE | 40 40 225 C2 | 1/1994 |
| DE | 41 40 614 C2 | 3/1994 |
| DE | 196 19 308 A1 | 11/1997 |
| DE | 40 04 530 C2 | 7/1999 |
| DE | 198 08 215 C2 | 3/2001 |
| EP | 0 419 082 A2 | 3/1991 |
| EP | 0 843 155 A1 | 5/1998 |
| GB | 2 069 286 | 8/1981 |
| WO | WO 98/21550 | 5/1998 |

OTHER PUBLICATIONS

International Search Report dated Jan. 27, 2003.

* cited by examiner

*Primary Examiner*—Bernarr E. Gregory
*Assistant Examiner*—Brian K Andrea
(74) *Attorney, Agent, or Firm*—Ostrolenk, Faber, Gerb & Soffen, LLP

(57) ABSTRACT

The optical distance detecting or measuring device comprises a light source with an emitting optic for projecting a light beam according to the axis of the emitting optic onto a target to be measured and a first detector defining the receiving axis contained in the same reference plane as the emitting axis. The device comprises at least a second detector that is aligned with the first detector on an axis contained in a plane that is inclined at an angle α with respect to the reference plane, said angle being comprised between 10° and 170°. Alternatively, two emitters may be arranged in an inclined plane and one receiver in the reference plane. This arrangement allows a significant improvement of the performance of such a device.

17 Claims, 4 Drawing Sheets

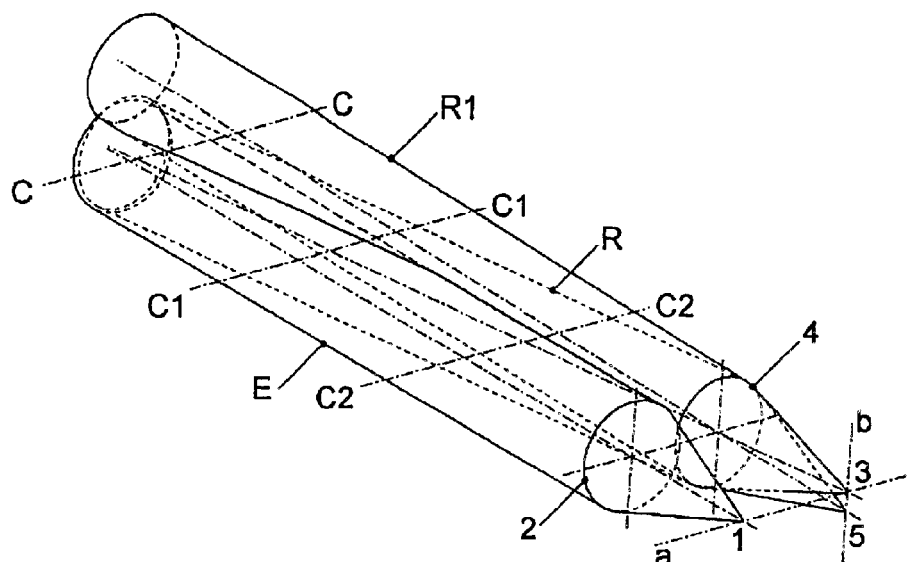
Figure 3
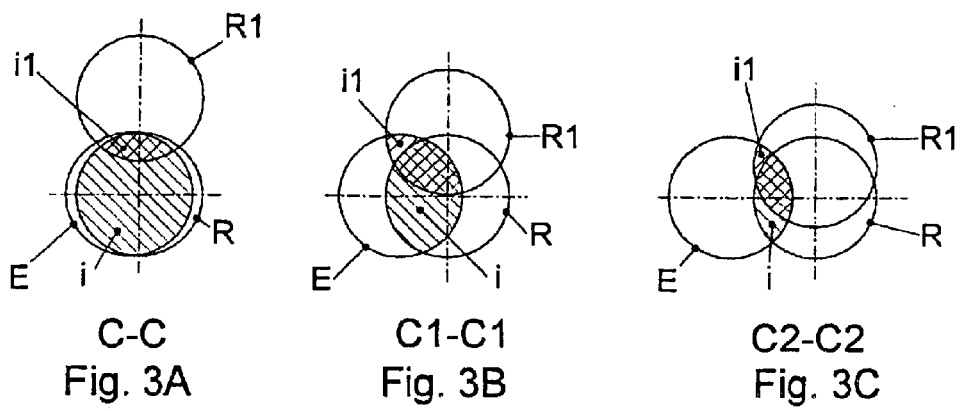
C-C
Fig. 3A
C1-C1
Fig. 3B
C2-C2
Fig. 3C
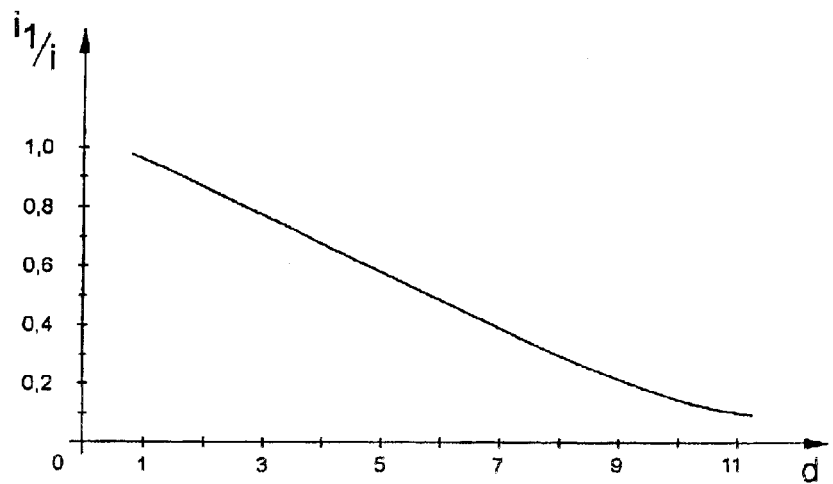
Figure 4

OPTICAL DISTANCE MEASURING DEVICE

FIELD OF THE INVENTION

The present invention refers to an optical distance detecting or measuring device, comprising a light source with an emitting optic for projecting a light beam according to the axis of the emitting optic onto a target to be measured and a first detector defining the receiving axis contained in the same reference plane as the emitting axis.

BACKGROUND OF THE INVENTION

Prior art devices including optical reflection sensors with background suppression or distance measuring devices generally make use of the triangulation principle described by FIG. 1. Beyond a maximum distance, the operation of the sensor is impaired due to the fact that the angular sensitivity decreases with the distance. When attempting to increase this distance, the result is an enlargement of the dead zone which excludes an operation in the proximity of the sensor.

In order to adapt this limited measuring range to varying situations, certain manufacturers use an adjustable mirror that allows the best adaptation of the measuring range. Such a solution is e.g. described in U.S. Pat. No. 3,759,614.

Other solutions are known as well: Different references such as GB-A-2 069 286 and DE-A-196 19 308 suggest a pulsed emission and an analysis of two receiver channels. DE-A-24 55 733 alternatingly uses two lighting optics located in the same plane. DE-C-40 04 530, DE-C-40 40 225, DE-C-41 40 614 as well as DE-C-198 08 215 suggest that a plurality of alternatingly emitting light sources are provided in the same optical channel. The receiver channel is formed by multiple detectors or by a position-sensitive detector, e.g. PSD, the electronic circuit being capable of processing the signals corresponding to each one of the light sources to obtain information concerning the distance to the target. A sophisticated treatment of this information allows a slight extension of the range of the measuring system.

However, the inherent limitations of the principle of triangulation between elements that are situated in the same plane as defined by the optical axes of the emitting and receiving systems do not allow a substantial improvement of the performance with respect to distance, linearity, and the dead zone. Thus, in the case of a measuring sensor or of a background suppression triangulation sensor, a calculation of the ratio between the maximum detection distance and the minimum distance of the measuring range yields a quality number that is rarely greater than 5. On the other hand, such detectors are very often sensitive to the amount of light reflected by the target, which depends on the texture and the color of the latter.

On the background of this prior art, a first object of the present invention consists in substantially improving the results of measurements by triangulation without the need for complex analyzing circuits. This is accomplished by an optical distance detecting or measuring device wherein said device comprises at least a second detector that is aligned with the first detector on an axis contained in a plane that is inclined at an angle with respect to the reference plane, said angle being comprised between 10° and 170°.

A second object is to allow the realization of efficient measuring or background suppression sensors having small dimensions. This is accomplished by an optical distance detecting or measuring device, comprising a light source and receivers, wherein the light source emits light pulses of different intensities that are intended alternatingly for each one of said receivers, the emitted intensities being regulated in such a manner as to produce signals having identical amplitudes or corresponding to a predetermined function on the receivers, and an optical distance detecting or measuring device, comprising a sensor with a single lens including distinct emitting and receiving sectors, each sector being provided with a prism for focusing the light beams on the emitting and the receiving elements, respectively.

BRIEF DESCRIPTION OF THE DRAWINGS

The invention will be explained in more detail hereinafter with reference to the accompanying drawings.

FIG. 3 illustrates the values measured in function of the distance;

FIGS. 3A–3C are sectional views according to C—C, C1—C1, and C2—C2 in FIG. 3;

FIG. 4 shows the performance of the invention;

DETAILED DESCRIPTION OF THE INVENTION

Figure 1:
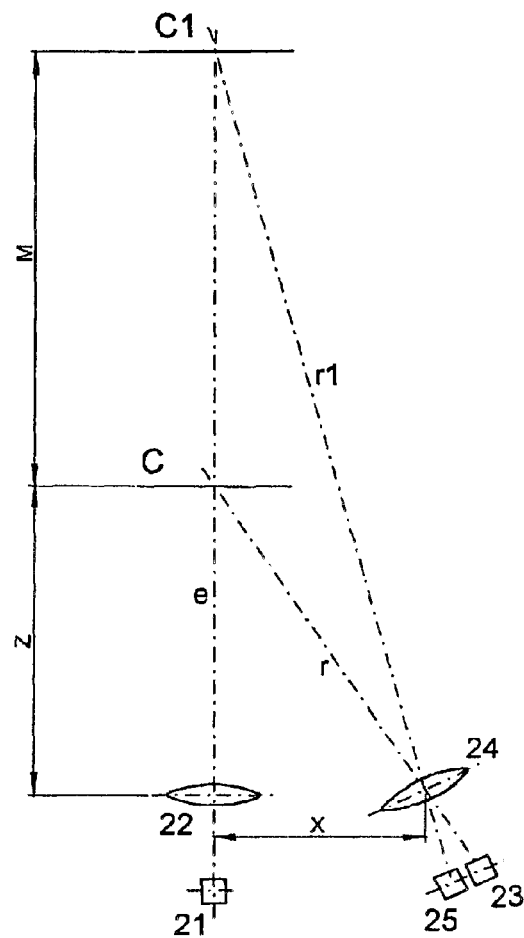
FIG. 1 schematically shows the known measuring principle by triangulation.

In FIG. 1, illustrating the known measuring principle by triangulation, shows light source 21 and emitting optic 22 which project the beam onto target C that is to be measured, thereby defining optical emitting axis e. The light resulting from the diffusing reflection of target C is focused on receiver 23 by lens 24. These two elements define the reference axis r of the receiving system. The axes of emitting optic e and of receiving optic r define a plane in which all elements of this triangulation measuring system are situated. Thus, an additional receiver 25 is disposed near the reference receiver. It determines a new receiving axis r1, also comprised in the same plane, which extends the measuring range to C1.

The detecting system is thus formed of an assembly of two or more detectors, and the same detecting function can also be realized by a position-sensitive detector such as PSD. The electronic circuit processing the signals delivered by the detectors will determine the position of the luminous impact and deduce the information of the measured distance from that position.

The performance of such an arrangement depends on the number of detectors and on the space therebetween, as well as on their position with respect to the emitting optic. With regard to basis X, which is defined as the distance between the emitting optic and the receiving optic, it appears that the measuring range M is limited and the dead zone Z is large. Linearity is affected by the sensitivity of the detectors to angular variations of the incident beam, which decreases as the distance from the target increases.

Figure 2:
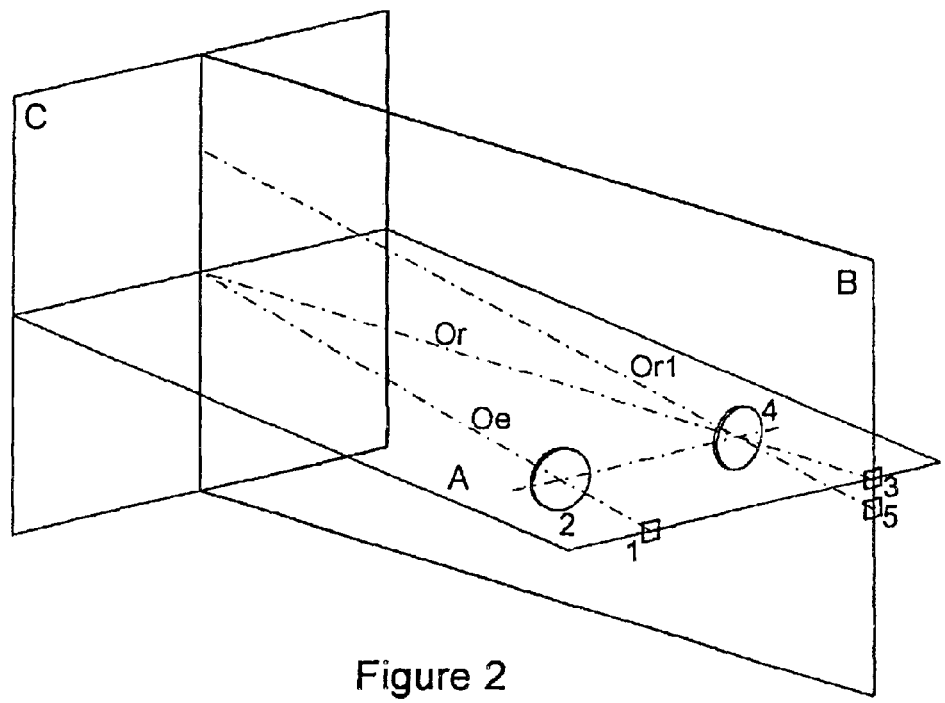
FIG. 2 describes the disposition of the measuring elements of the invention.

The present invention provides a different arrangement of the detectors. The novel arrangement is shown in FIG. 2, illustrating light source 1 and the lens of emitting channel 2, which define the optical axis Oe of the emitting system.

Reference detector 3 and lens 4 define the reference axis Or of the receiving system. These two axes of the emitter and the receiving system determine reference plane A. Plane C represents the target that is to be detected or whose distance is to be measured.

It will be shown that when an additional detector 5, defining a new receiving axis Or1, is situated in a plane B that is inclined at an angle α with respect to reference plane A, the intensities measured by the detectors allow to obtain a highly linear information in function of the distance in a large measuring range. The optimum value of inclination α is 90°, but any other inclination α between 10° and 170° is advantageous. In the text, reference will be made to 90°, while it is understood that the angle α may be different.

FIG. 3 schematically shows the envelopes of the beams in the suggested arrangement. Envelope E of the idealized emitting beam is shown in the case of a large distance focusing of source 1 and of lens 2. After lens 2, the envelope is cylindrical. The envelopes of receiving beams R and R1 are also illustrated in a cylindrical form. Emitting source 1 and reference receiver 3 are situated in the principal plane and aligned on axis a while the two receivers 3 and 5 are aligned on an axis b that is perpendicular to axis a.

FIGS. 3A to 3C show the intersections of the three beams for three positions of the target and allow to determine the ratios between the luminous intensities measured by the two receivers by means of an area calculation.

If the ratio between the intensity of principal receiving beam i and that of secondary beam i1 is calculated and this ratio is represented in function of the distance d measured between the detector and the target, the diagram of FIG. 4 is obtained. It appears that the variation of this ratio i1/i is linear in a large portion of the measuring range. A calculus of the ratio between the maximum distance and the dead zone, as defined earlier in the description, yields a quality number of up to 10. The diagram of FIG. 4 shows clearly that the first object of the present invention is attained, namely the improvement of the measuring results by triangulation, i.e. a large measuring range, a very small dead zone, and a high linearity are obtained.

In order to obtain these results, it is important that the envelope curves of the beams are as cylindrical as possible. This must be the case over a distance corresponding to the measuring range. To this effect, the real rather than the punctual dimensions of the source and of the detectors must be taken into account. The distances between these components and the lenses must be adapted to the focal distances in such a manner that the beams are as close to the cylindrical shape as possible.

Figure 5:
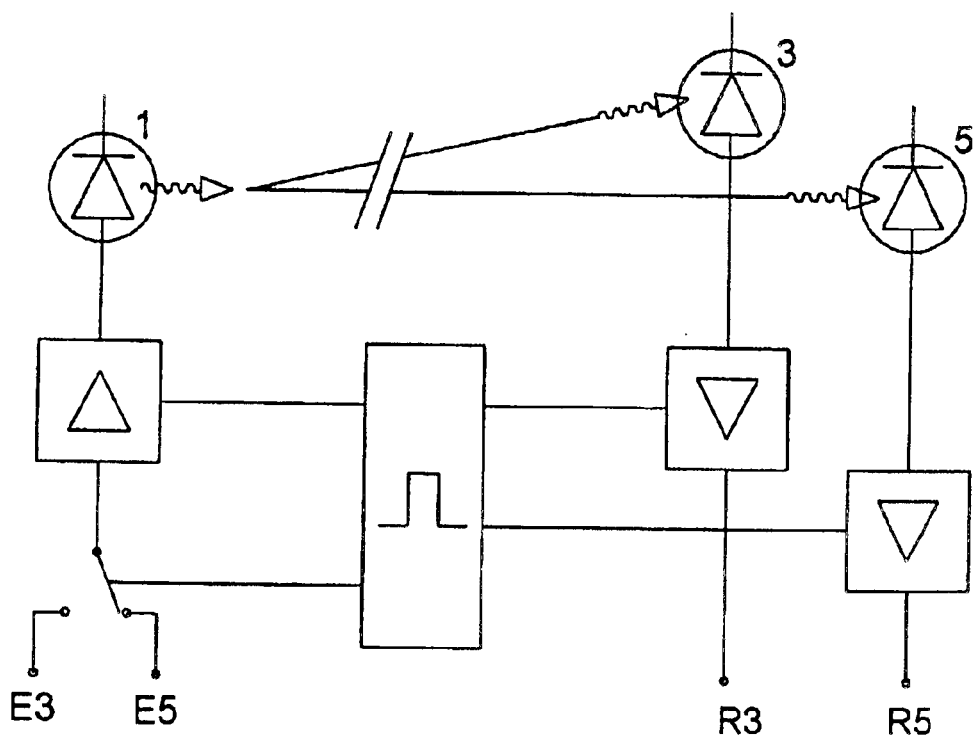
FIG. 5 schematically describes a simple embodiment of a device of the invention.
Figure 5:
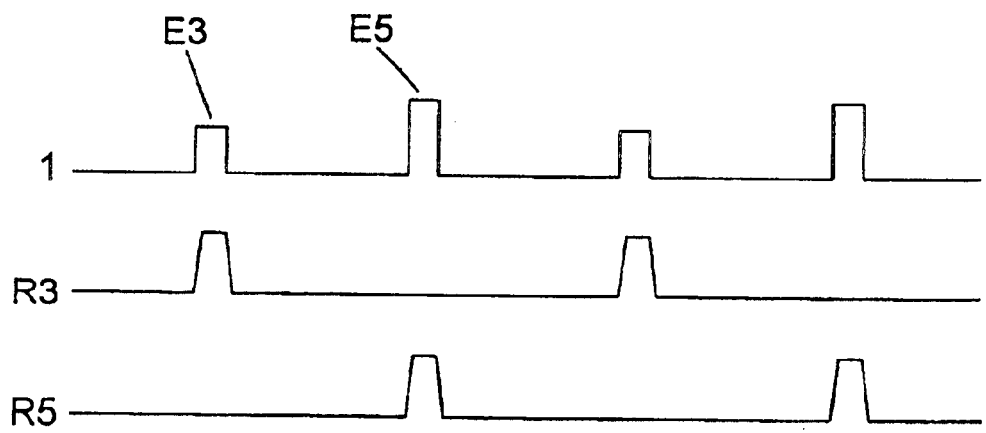

A device realized according to this principle, comprising an emitter LED and two receiving photodiodes, is suggested and schematically described by FIG. 5 as an example of a simple embodiment. The light pulses are emitted by LED 1 alternatingly for each one of photodiodes 3 and 5. In this exemplary embodiment, the photodiodes are aligned on an axis that is perpendicular to the plane defined by the emitting axis and the reference receiving axis. The alternating emitting intensities E3 and E5 are regulated such that the respective amplitudes of the signals R3 and R5 measured by each one of the receivers are identical or correspond to a predetermined function. The information concerning the distance results from the ratio of the intensities E3 and E5 of the emitted light. This procedure offers the additional advantage of a very low sensitivity of this device to the color of the target.

The described principle, according to which the alternating emitting intensities E3 and E5 are regulated such that the respective amplitude of the signals R3 and R5 measured by each one of the receivers are identical or correspond to a predetermined function, applies both to an optical device where the photodiodes are situated in the same plane as the emitter diode or in an inclined plane.

However, the advantage of this principle combined with the advantage of the inclined plane results in a particularly advantageous device.

Figure 6A:
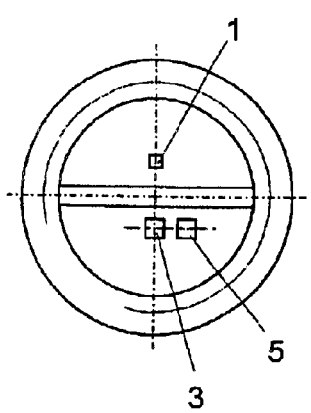
FIG. 6A shows a sectional view according to line F—F of the sensor of FIG. 6.
Figure 6:
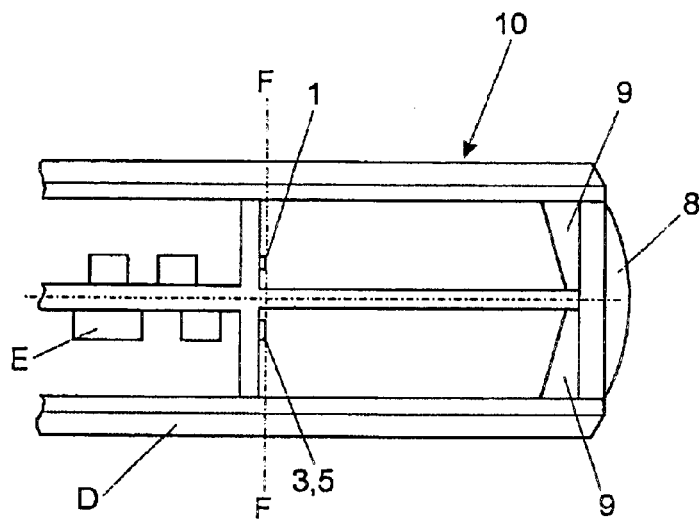
FIG. 6 shows the realization of a compact sensor.

An example of a compact sensor that is adapted for realizing a device according to FIG. 5 is described by FIG. 6. Sensor 10 comprises a small enclosure D including the optical components and the electronic circuits E. Also visible are emitter LED 1 and the two photodiodes 3 and 5, which are arranged on a perpendicular axis, as well as the principle of the emitter and the receiving optics using the same lens 8. This is possible thanks to the two prisms 9, which are arranged behind the lens and allow a spatial separation of the emitting and of the receiving beam. The latter principle applies both to an optical device where the photodiodes are situated in the same plane as the emitter diode or in an inclined plane. Such a compact sensor may also be realized and applied in other distance measuring devices comprising one or a plurality of emitters and one or a plurality of receivers of the prior art.

The solutions according to FIGS. 5 and 6 show that the second object of the present invention is attained, i.e. the realization of a sensor of small dimensions in which the optical and electronic assemblies required for its operation are integrated. The invention thus allows an improvement of the performance of current sensors while conserving their size, and also the realization of smaller and more performing sensors.

The preceding demonstration of the performance of a measuring system based on one emitter and two detectors may be extended to a greater number of detectors and also to a position-sensitive detector such as PSD, whose axis of sensitivity may be situated either in the plane A defined by the emitting axis and the reference receiver axis, or inclined at an angle α, preferably at 90°, with respect to the plane A.

Figure 7:
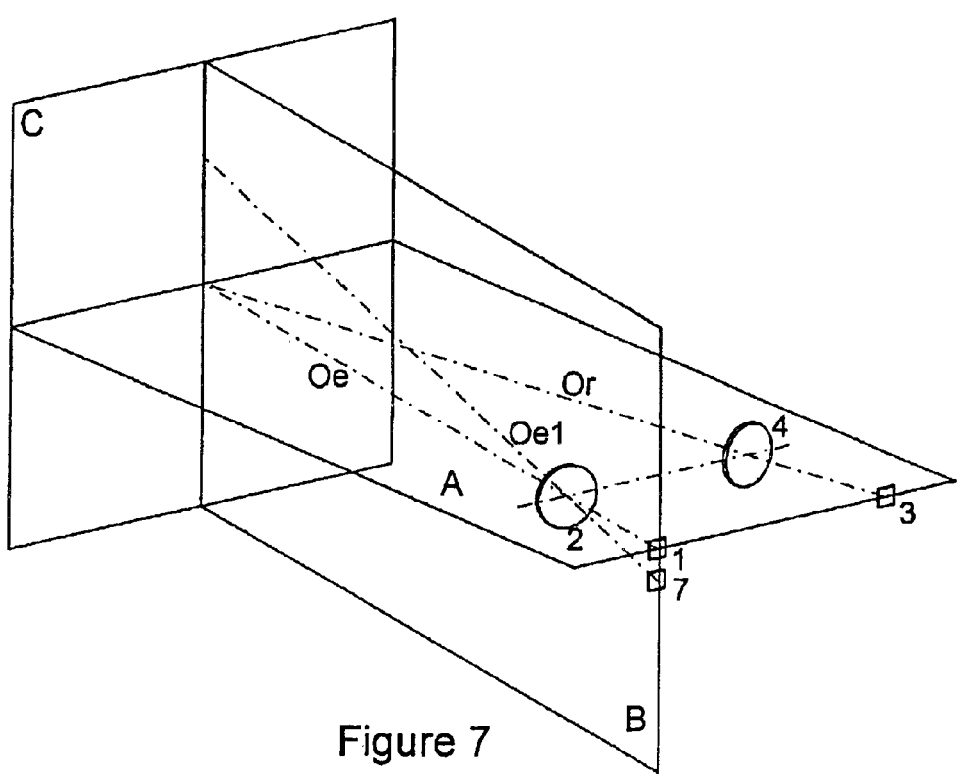
FIG. 7 describes a variant of the embodiment of FIG. 2.

The principle described above is also applicable in the case of the measuring system of FIG. 7, where the emitting and the receiving elements are inverted as compared to the system described in FIG. 2. This system comprises two or several emitting sources 1 and 7 aligned in a plane B that is inclined at an angle α, preferably at 90°, with respect to plane A which is defined by the reference emitting axis Oe and the receiving axis Or extending between receiver 3 and optic 4 for focusing the diffuse light on the receiver.

What is claimed is:

1. An optical distance detecting or measuring device, comprising a light source with an emitter optic for projecting a light beam according to an axis of the emitting optic onto a target to be measured, and a first detector for measuring an intensity of reflected source light received by the first detector and defining a receiving axis contained in a same reference plane as the emitting axis, at least a second detector for measuring an intensity of reflected source light received by the second detector, the first and second detectors being aligned on an axis contained in a plane that is inclined at an angle with respect to the reference plane, said angle being comprised between 10° and 170°, and a processing circuit for determining ratios between measured intensities of reflected source light at the at least first and second detectors, said ratios representing a distance.

2. An optical distance detecting or measuring device, comprising at least a first light source with an emitting optic for projecting a light beam according to an axis of the emitting optic onto a target to be measured, and a first detector defining a receiving axis contained in a same reference plane as the emitting axis, at least a second light source that is aligned with the first light source on an axis contained in a plane that is inclined at an angle with respect to the reference plane, said angle being comprised between 10° and 170°, and a processing circuit, wherein the first detector is for measuring intensities of reflected at least first and second source lights received by the first detector, and wherein the processing circuit determines ratios between measured intensities of reflected at least first and second source lights, said ratios representing a distance.

3. An optical distance detecting or measuring device, comprising a light source and receivers, wherein the light source emits light pulses of different intensities that are intended alternatingly for each one of said receivers, emitted intensities being regulated in such a manner as to produce signals having identical amplitudes or corresponding to a predetermined function on the receivers.

4. The device of claim 1, comprising a light source and receivers, wherein the light source emits light pulses of different intensities that are intended alternatingly for each one of said receivers, the emitted intensities being regulated in such a manner as to produce signals having identical amplitudes or corresponding to a predetermined function on the receivers.

5. The device of claim 1, comprising a detecting system in the form of a position-sensitive detector (PSD).

6. An optical distance detecting or measuring device, comprising a sensor with a single lens including distinct emitting and receiving sectors, each sector being provided with a prism for focusing light beams on emitting and receiving elements, respectively.

7. The device of claim 1, comprising a sensor with a single lens including distinct emitting and receiving sectors, each sector being provided with a prism for focusing the light beams on the emitting and the receiving elements, respectively.

8. The device of claim 1, wherein the receiving system comprises more than two receivers.

9. The device of claim 2, wherein the emitting system comprises more than two light sources.

10. The device of claim 1, comprising a group of several receivers and a group of several emitters, each group being aligned on an axis contained in planes of which each one may be inclined individually with respect to said reference plane.

11. The device of claim 2, comprising a light source and receivers, wherein the light source emits light pulses of different intensities that are intended alternatingly for each one of said receivers, the emitted intensities being regulated in such a manner as to produce signals having identical amplitudes or corresponding to a predetermined function on the receivers.

12. The device of claim 2, comprising a detecting system in the form of a position-sensitive detector (PSD).

13. The device of claim 3, comprising a detecting system in the form of a position-sensitive detector (PSD).

14. The device of claim 2, comprising a sensor with a single lens including distinct emitting and receiving sectors, each sector being provided with a prism for focusing the light beams on the emitting and the receiving elements, respectively.

15. The device of claim 3, comprising a sensor with a single lens including distinct emitting and receiving sectors, each sector being provided with a prism for focusing the light beams on the emitting and the receiving elements, respectively.

16. The device of claim 2, comprising a group of several receivers and a group of several emitters, each group being aligned on an axis contained in planes of which each one may be inclined individually with respect to said reference plane.

17. The device of claim 3, comprising a group of several receivers and a group of several emitters, each group being aligned on an axis contained in planes of which each one may be inclined individually with respect to said reference plane.

* * * * *